US008838747B2

(12) United States Patent
Abe

(10) Patent No.: US 8,838,747 B2
(45) Date of Patent: Sep. 16, 2014

(54) CHANGING DATA RECEIVED FROM THE WEB USING LOCAL DATA

(75) Inventor: Yuichi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 12/943,383

(22) Filed: Nov. 10, 2010

(65) Prior Publication Data

US 2011/0119356 A1 May 19, 2011

(30) Foreign Application Priority Data

Nov. 19, 2009 (JP) ................. 2009-264240

(51) Int. Cl.
- *G06F 15/16* (2006.01)
- *G06F 17/30* (2006.01)

(52) U.S. Cl.
CPC ............... *G06F 17/30893* (2013.01)
USPC ......................................................... 709/219

(58) Field of Classification Search
None
See application file for complete search history.

(56) References Cited

U.S. PATENT DOCUMENTS

| 6,055,542 | A | 4/2000 | Nielsen et al. |
|---|---|---|---|
| 6,944,817 | B1 | 9/2005 | Danneels |
| 8,060,715 | B2 * | 11/2011 | Cremelie et al. ............... 711/162 |
| 2004/0133467 | A1 * | 7/2004 | Siler ............................... 705/14 |
| 2007/0180147 | A1 * | 8/2007 | Leigh ............................. 709/246 |
| 2009/0177761 | A1 | 7/2009 | Meyer et al. |
| 2010/0057830 | A1 * | 3/2010 | Takala ............................ 709/203 |
| 2010/0250858 | A1 * | 9/2010 | Cremelie et al. ............... 711/136 |

FOREIGN PATENT DOCUMENTS

| JP | 2006-350979 A | 12/2006 |
|---|---|---|
| JP | 2007-047946 A | 2/2007 |

* cited by examiner

*Primary Examiner* — Brian P Whipple
(74) *Attorney, Agent, or Firm* — Wolf, Greenfield & Sacks, P.C.

(57) ABSTRACT

There is provided a data processing system including a server device for providing Web data having a data portion with a specific identifier, and a data processing apparatus having a receiving unit for receiving the Web data from the server device, an analysis unit for analyzing the Web data to extract the specific identifier from the Web data, and a data processing unit for changing the data portion with the specific identifier based on local data.

17 Claims, 11 Drawing Sheets

FIG. 6

| MANAGEMENT ID | Type | URL | Tag |
|---|---|---|---|
| 1001 | IMAGE | http://xxx/yyy.jpg | 2009/9, TRIP TO OKINAWA, trip, 1280x720 |
| 1002 | IMAGE | http://yyy/xxx.jpg | 2009/8, FIREWORKS, 720x1280 |
| 1015 | MOVIE | http://aaa/bbb.flv | 2008/10, 320x240, ATHLETIC FESTIVAL |
| ... | ... | ... | ... |

FIG. 9

| Type | Data |
|---|---|
| DATE OF BIRTH | xxxx/yy/zz |
| SEX | MALE |
| ADDRESS | SHINAGAWA-KU, TOKYO |
| HOBBY | WATCHING MOVIES |
| ⋮ | ⋮ |

CHANGING DATA RECEIVED FROM THE WEB USING LOCAL DATA

BACKGROUND OF THE INVENTION

1. Field of the Invention

The present invention relates to a data processing system, a data processing apparatus, a program, and a data processing method.

2. Description of the Related Art

Recently, with the development of information communication technology, various data has been transmitted/received via network. Especially with the prevalence of HTML which is a markup language, and with the technical advantages of a Web browser for viewing documents written in HTML, it becomes easy for an ordinary user to view Web data provided by a Website master.

Here, the Web data consists of various data not only text information but also such as image, audio, and movie, managed by a Website master. However, since the Web data is created by the Website master for unspecified users, it is not necessarily attractive to each of the user. For example, a Website selling photo frames posts beautiful images shot by professionals as sample images, however, the quality and objects of images that users are actually taking likely be different from the samples in many cases.

On the other hand, if images that each of the users is usually taking would be posted, instead of the images which the Website master is providing to unspecified users, along with the commodities of photo frames as Web data, it becomes more attractive to the users. If the image shown in the photo frame on the Web data would be a photo image of children of a user or a photo image of fish taken by a user who is fond of diving, the users can easily imagine to themselves its actual usability.

Regarding the issue above, Japanese Unexamined Patent Application Publication No. 2006-350979 proposed a system for synthesizing an image of a user's face and an image of a kimono available for purchase or rent, and for making sure how the user's face and shape look in the kimono on a screen of display. Japanese Unexamined Patent Application Publication No. 2007-47946 proposed a selling system for displaying a commodity of a curtain synthesized in an image of a room taken by a user. Such system can synthesize images specific to each of users, not images for unspecified users such as an image of a model in kimono or an image of curtain in a model room.

SUMMARY

However, the above-mentioned system may have a necessity that a user clearly instructs which image of the user is to synthesize with Web data, or to which part of the Web data the image of the user is to be synthesized, or the like. There has been an issue that the above-system, which is expecting the user instruction for each Web data, is not suitable for a Web browser that keeps viewing a lot of Web data.

In light of the foregoing, it is desirable to provide a data processing system, a data processing apparatus, a program, and a data processing method, which are novel and improved, and which are capable of automatically changing a specific data portion in Web data.

According to an exemplary embodiment of the present invention, there is provided a data processing system including a server device for providing Web data having a data portion with a specific identifier, and a data processing apparatus including a receiving unit for receiving the Web data from the server device, an analysis unit for analyzing the Web data to extract the specific identifier from the Web data, and a data processing unit for changing the data portion with the specific identifier based on local data.

The data processing apparatus may further include an obtaining unit for obtaining local data matching a search condition which is set on the data portion with the specific identifier. The data processing unit may change data based on the local data obtained by the obtaining unit.

The data processing unit may replace the data portion with the specific identifier with the local data obtained by the obtaining unit.

The local data may be managed by the data processing apparatus or a home network which comprises of a plurality of devices including the data processing apparatus.

The local data may include user profile information, and the data processing unit may select data corresponding to the profile information from the data portion with the specific identifier.

The local data may include user profile information, and the data processing unit may sort an order of data contained in the data portion with the specific identifier based on the profile information.

According to another exemplary embodiment of the present invention, there is provided a data processing apparatus including a receiving unit for receiving Web data from a server device providing the Web data having a data portion with a specific identifier, an analysis unit for analyzing the Web data to extract the specific identifier from the Web data, and a data processing unit for changing the data portion with the specific identifier based on local data.

According to another exemplary embodiment of the present invention, there is provided a program to cause a computer to function as a receiving unit for receiving Web data from a server device providing the Web data having a data portion with a specific identifier, an analysis unit for analyzing the Web data to extract the specific identifier from the Web data, and a data processing unit for changing the data portion with the specific identifier based on local data.

According to another exemplary embodiment of the present invention, there is provided a data processing method including the steps of receiving Web data from a server device providing the Web data having a data portion with a specific identifier, analyzing the Web data to extract the specific identifier from the Web data and changing the data portion with the specific identifier based on local data.

According to the exemplary embodiments of the present invention described above, it is possible to automatically change a specific data portion in Web data.

BRIEF DESCRIPTION OF THE DRAWINGS

FIG. 6 is an explanatory diagram for illustrating a concrete example of the content information;

FIG. 9 is an explanatory diagram for illustrating a concrete example of profile information;

DETAILED DESCRIPTION OF THE EXEMPLARY EMBODIMENT(S)

Figure 1:
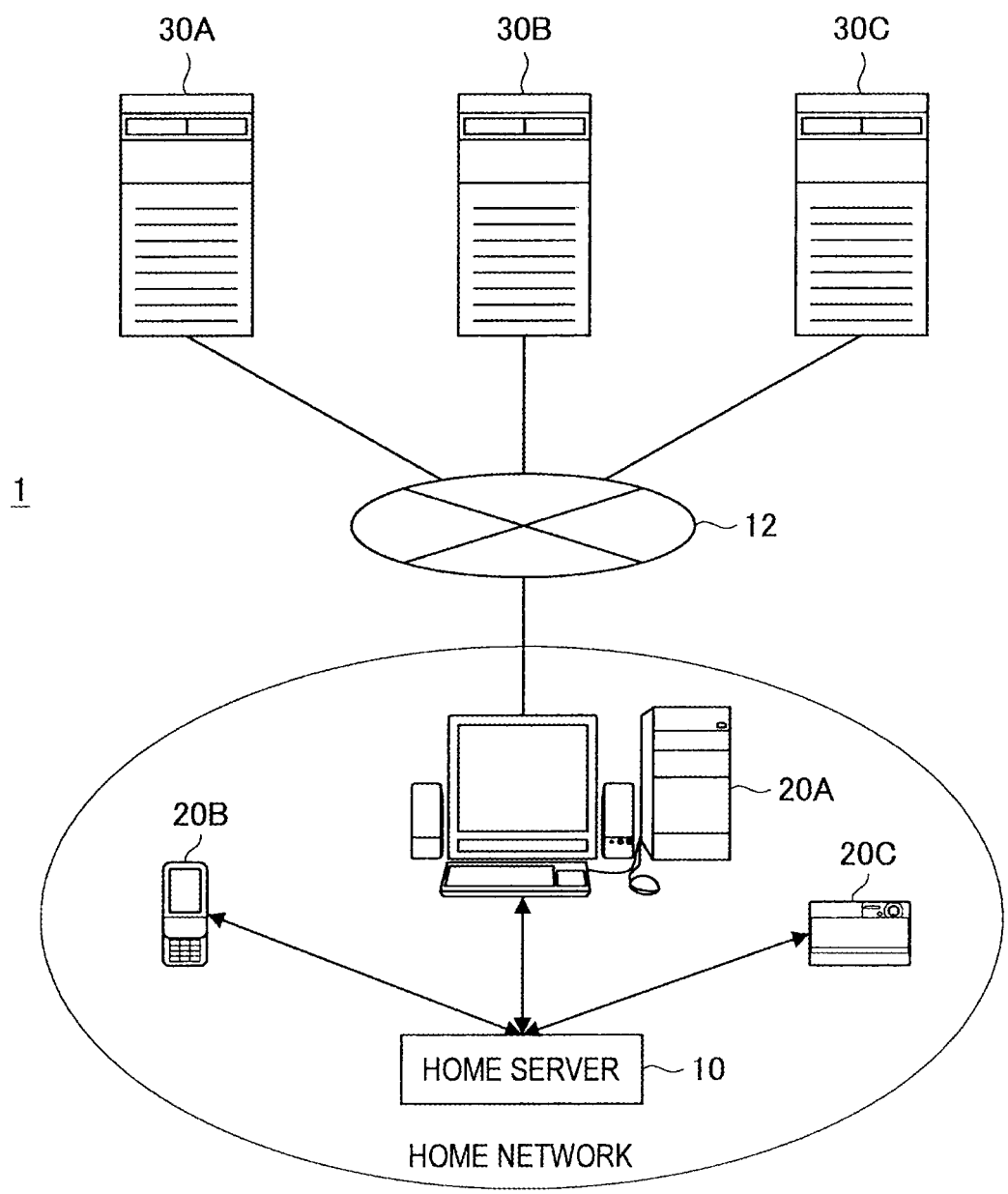
FIG. 1 is an explanatory diagram for illustrating a configuration of a data processing system according to a first exemplary embodiment of the present invention.

Hereinafter, preferred exemplary embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Additionally, in this specification and drawings, a plurality of structural elements having substantially the same functional configuration are sometimes distinguished from each other by a different alphabet letter added to a same numeral. For example, a plurality of structures having substantially the same functional configuration are distinguished from each other as necessary by being referred to as user devices 20A, 20B and 20C. However, in case it is not necessary to distinguish between a plurality of structural elements having substantially the same functional configuration, only a same numeral is added thereto. For example, in case it is not particularly necessary to distinguish between the user devices 20A, 20B and 20C, they will be collectively referred to as the user devices 20.

Preferred exemplary embodiments of the present invention will be described hereinafter in the following order:
1. First exemplary embodiment
   1-1. Overall configuration of a data processing system according to the first exemplary embodiment
   1-2. Hardware configuration of a user device
   1-3. Functions of a user device and a home server according to the first exemplary embodiment
   1-4. Collection of content information
   1-5. Synthesis of local content
2. Second exemplary embodiment
   2-1. Functions of a user device and a home server according to the second exemplary embodiment
   2-2. Selecting Web data to be displayed 2-3. Sorting Web data
3. Conclusion <First Exemplary Embodiment>

(1-1. Overall Configuration of a Data Processing System According to the First Exemplary Embodiment)

At first, referring to FIGS. 1 and 2, an overall configuration of a data processing system 1 according to an exemplary embodiment of the present invention will be explained. FIG. 1 is an explanatory diagram for illustrating a configuration of the data processing system 1 according to a first exemplary embodiment of the present invention. As shown in FIG. 1, the data processing system 1 according to the first exemplary embodiment of the present invention includes a home server 10, an external network 12, user devices 20A, 20B and 20C, and Web servers 30A, 30B and 30C.

The Web server 30 (server device) stores Web data created in HTML format, XML format or the like, and transmits the Web data to the user device 20 in response to a request from the user device 20. The Web server 30 is set up by, for example, a commodity seller, and stores Web data or the like for appealing the commodities for sale, and for selling the commodities. Specifically, the Web server 30 may be set up by a seller of photo frames, and may store Web data for appealing the photo frames and for selling the photo frames. Note that only three Web servers 30A, 30B and 30C are illustrated in FIG. 1, however, several hundreds and thousands of the Web servers 30 may be connected to the external network 12.

The user devices (data processing apparatus) 20A, 20B and 20C are an information processing apparatuses that constitute a home network managed by the home server 10. Each of the user devices 20 can hold contents such as a broadcasting program, an image and a movie shot by a user, or music or the like in a built-in storage medium. Note that such user devices 20 are not necessarily constantly connected to the home network, and may be connected to the home network arbitrarily depending on the current position, a purpose, a necessity and the like.

The user devices 20 have functions as a Web browser that obtains Web data from the Web server 20 via the external network 12 and that presents the Web data to a user. Further, the user devices 20 according to the present exemplary embodiment can synthesize local content managed in the home network as local data with the Web data obtained from the Web server 30, and present the Web data after synthesized to the user.

Figure 2:
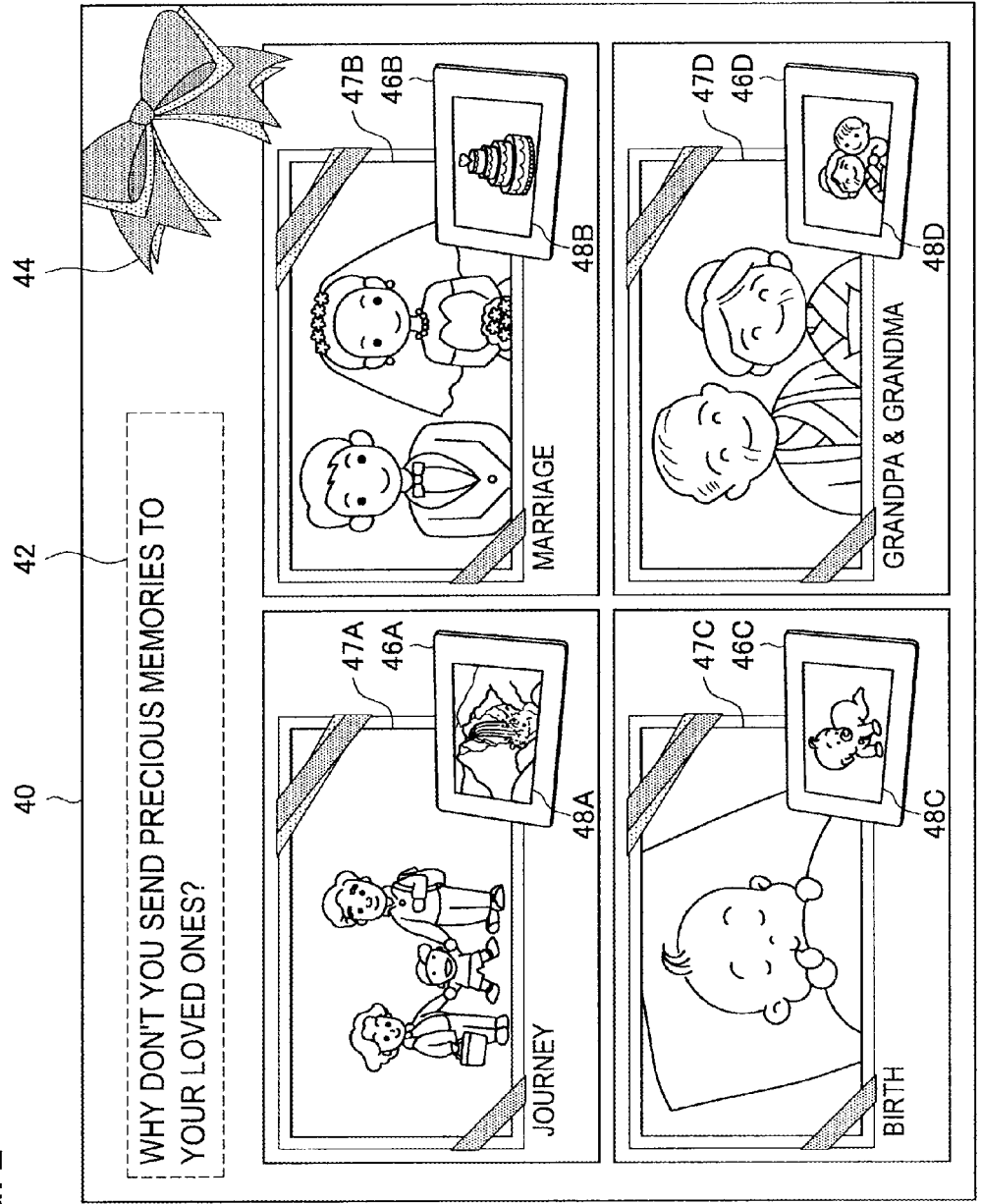
FIG. 2 is an explanatory diagram for illustrating a concrete example of Web data after synthesized.

FIG. 2 is an explanatory diagram for illustrating a concrete example of Web data 40 after synthesized. As shown in FIG. 2, the Web data 40 after synthesized includes a character string 42, an icon 44, photo frames 46A to 46D, and photo images 47A to 47D and 48A to 48B. Here, the character string 42, the icon 44, the photo frames 46A to 46D, and layout information are information provided from the Web server 30, whereas the photo images 47A to 47D and 48A to 48B are user's personal photo images managed in the home network.

As shown in FIG. 2, if the user's personal photo images 48A to 48B are displayed in the commodities of photo frames 46A to 46D, the user can image easily the actual usability of the photo frames 46A to 46D. Further, the user device 20 according to the present exemplary embodiment can automatically synthesize data of the local content (for example, a photo image) with regard to the Web data, and it is very convenient for the user. Regarding data synthesis of the Web data and local content will be explained in detail later after <1-3. Functions of a user device and a home server according to the first exemplary embodiment>.

Note that the present specification will explain a case where an application that synthesizes data is a Web browser, however, the data synthesis according to the present exemplary embodiment can be applied to applications other than the Web browser, which are installed onto the user device 20.

Moreover, in FIG. 1, as an example of the user device 20, a personal computer (PC), a cellular phone, and a mobile imaging device are shown, however, the user device 20 is not limited to this example. The user device 20 may be, for example, a Network Attached Storage (NAS), a HDD recorder, a television set, a set-top box, a home game machine, a home appliance, a portable playback device, a portable video processing device, or a portable game machine.

Note that the external network 12 is a wired or wireless transmission path for information transmitted from devices that are connected to the external network 12. For example, the external network 12 may include a public network such as the Internet, a telephone network, or a satellite network, various local area networks (LANs) including Ethernet (registered trademark), or a wide area network (WAN). Furthermore, the external network 12 may include a leased line network such as an Internet protocol-virtual private network (IP-VPN).

The home server 10 collects information of local content (hereinafter referred to as "content information") stored in the user devices 20A to 20C in the home network, accumulates the collected content information, and provides the content information to the user devices 20A to 20C in the home network. Here, the content information is not an entity (data) of the local content itself, but what includes information indicating the location of the entity of the local content. For example, the content information includes information in which folder of which user device in the home network the entity of the local content exists, what name of the folder it is, or the like. This enables the user device 20 that has received the content information to identify a user device having the entity of the local content based on the content information, and to obtain the entity of the local content by accessing to the user device.

Thus, the user device 20 stores the local content whereas the home server 10 does not store it. This enables data redundancy to be prevented in the home network, and eliminates data quantity of the home server 10. However, in a case where the user device 20 frequently leaves the home network or where it is difficult to constantly turn on the power, the home server 10 may store the local content therein. For example, at a time when the user device 20 is connected to the home network or when the power is turned on, the local content of the user device 20 may be copied into the home server 10.

(1-2. Hardware Configuration of a User Device)

Heretofore, referring to FIG. 1 and FIG. 2, the overall configuration of a data processing system 1 according to the first exemplary embodiment of the present invention has been explained. Next, referring to FIG. 3, the hardware configuration of the user device 20 will be explained.

Figure 3:
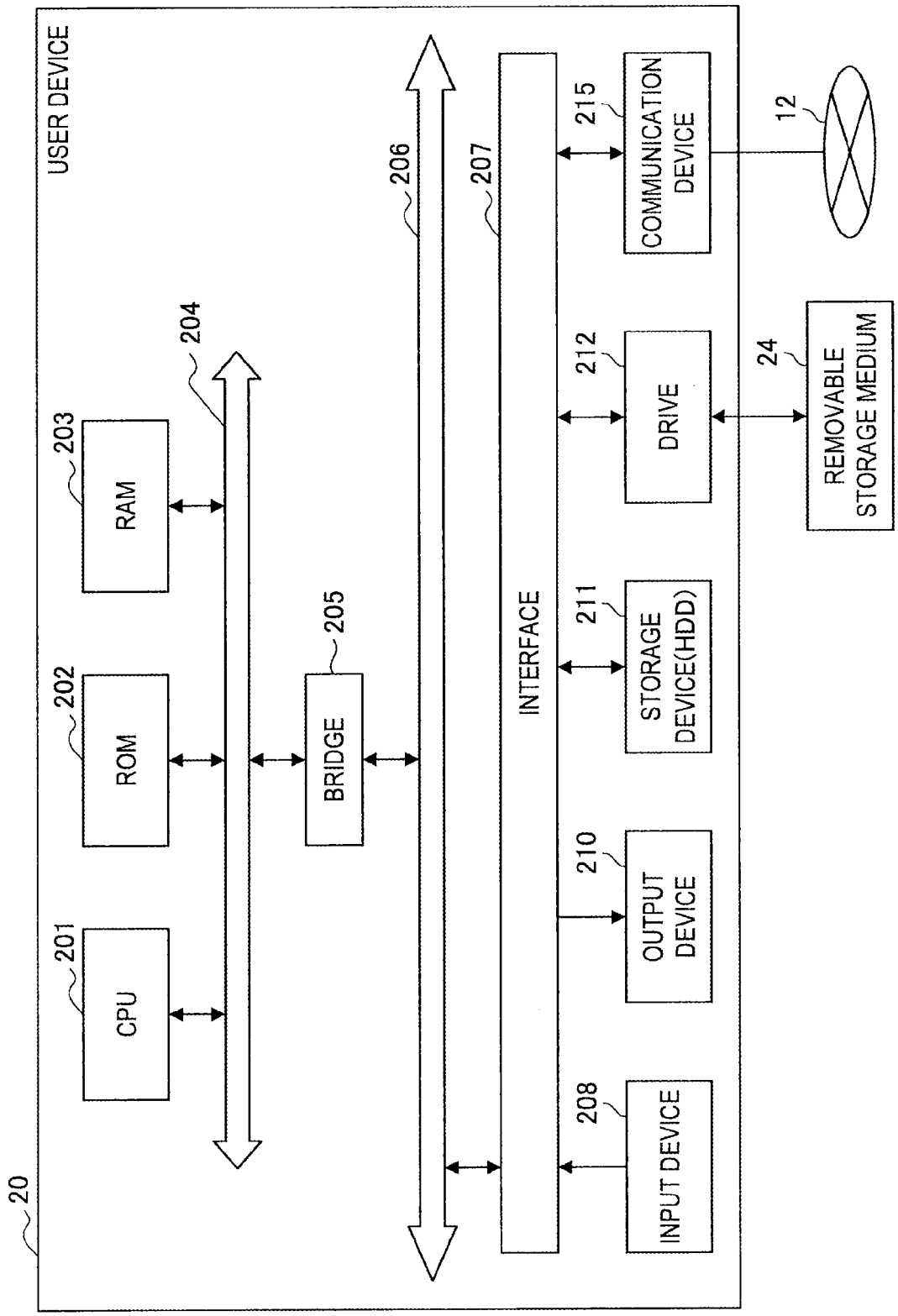
FIG. 3 is a block diagram for illustrating a hardware configuration of a user device.

FIG. 3 is a blog diagram for illustrating a hardware configuration of a user device 20. The user device 20 includes a CPU (Central Processing Unit) 201, a ROM (Read Only Memory) 202, a RAM (Random Access Memory) 203, and a host bus 204. Moreover, the user device 20 includes a bridge 205, an external bus 206, an interface 207, an input device 208, an output device 210, a storage device (HDD) 211, a drive 212, and a communication device 215.

FIG. 3 is a blog diagram for illustrating a hardware configuration of a user device 20. The user device 20 includes a CPU (Central Processing Unit) 201, a ROM (Read Only Memory) 202, a RAM (Random Access Memory) 203, and a host bus 204. Moreover, the user device 20 includes a bridge 205, an external bus 206, an interface 207, an input device 208, an output device 210, a storage device (HDD) 211, a drive 212, and a communication device 215.

The CPU 201 functions as an arithmetic processing unit and a controlling unit and controls general operation in the user device 20 in accordance with a variety of programs. The CPU 201 may be a microprocessor. The ROM 202 stores the programs and arithmetic parameters to be used by the CPU 201. The RAM 203 temporarily stores programs to be used during the operation of the CPU 201, parameters to vary appropriately during the operation thereof and the like. These are mutually connected by the host bus 204 constituted with a CPU bus and the like.

The host bus 204 is connected to the external bus 206 such as a peripheral component interconnect/interface (PCI) bus via the bridge 205. Here, it is not necessary to separately constitute the host bus 204, the bridge 205 and the external bus 206. The functions thereof may be mounted on a single bus.

The input device 208 is constituted with an input means such as a mouse, a keyboard, a touch panel, a button, a microphone, a switch and a lever to input information by a user, and an input controlling circuit to generate an input signal based on the input by the user and to output the signal to the CPU 201. The user of the user device 20 can input a variety of data and instruct the user device 20 to process operation by operating the input device 208.

The output device 210 includes a display device such as a cathode ray tube (CRT) display device, a liquid crystal display (LCD) device, an organic light emitting diode (OLED) device and a lamp. Further, the output device 210 includes an audio output device such as a speaker and a headphone. The output device 210 outputs a reproduced content, for example. Specifically, the display device displays various types of information such as reproduced video data with texts or images. Meanwhile, the audio output device converts reproduced audio data and the like into audio and outputs the audio.

The storage device 211 is a device for data storage configured to be an example of a memory unit of the user device 20 according to the present exemplary embodiment. The storage device 211 may include a storage medium, a recording device to record data at the storage medium, a reading device to read the data from the storage medium, and a deleting device to delete the data recorded at the storage medium. The storage device 211 is configured with a hard disk drive (HDD), for example. The storage device 211 drives the hard disk and stores programs to be executed by the CPU 201 and a variety of data.

The drive 212 is a reader/writer for the storage medium and is incorporated by or externally attached to the user device 20. The drive 212 reads the information stored at a mounted removal storage medium 24 such as a magnetic disk, an optical disk, a magneto-optical disk and a semiconductor memory and outputs the information to the RAM 203. The drive 212 can write information onto the removal storage medium 24.

The communication device 215 is a communication interface constituted with a communication device and the like to be connected to the external network 12 and the home network, for example. Here, the communication device 215 may be a wireless local area network (LAN) compatible communication device, a LTE (Long Term Evolution) compatible communication device or a wired communication device to perform communication with a cable.

The hardware configuration of the user device 20 has been explained referring to FIG. 30 above. The hardware of the home server 10 may have substantially the same function and structure with the user device 20, therefore, the explanation of the hardware of the home server 10 will be omitted.

(1-3. Functions of the User Device and the Home Server According to the First Exemplary Embodiment)

Next, referring to FIG. 4, a brief explanation will be given on the functions of the user device 20 and the home server 10.

Figure 4:
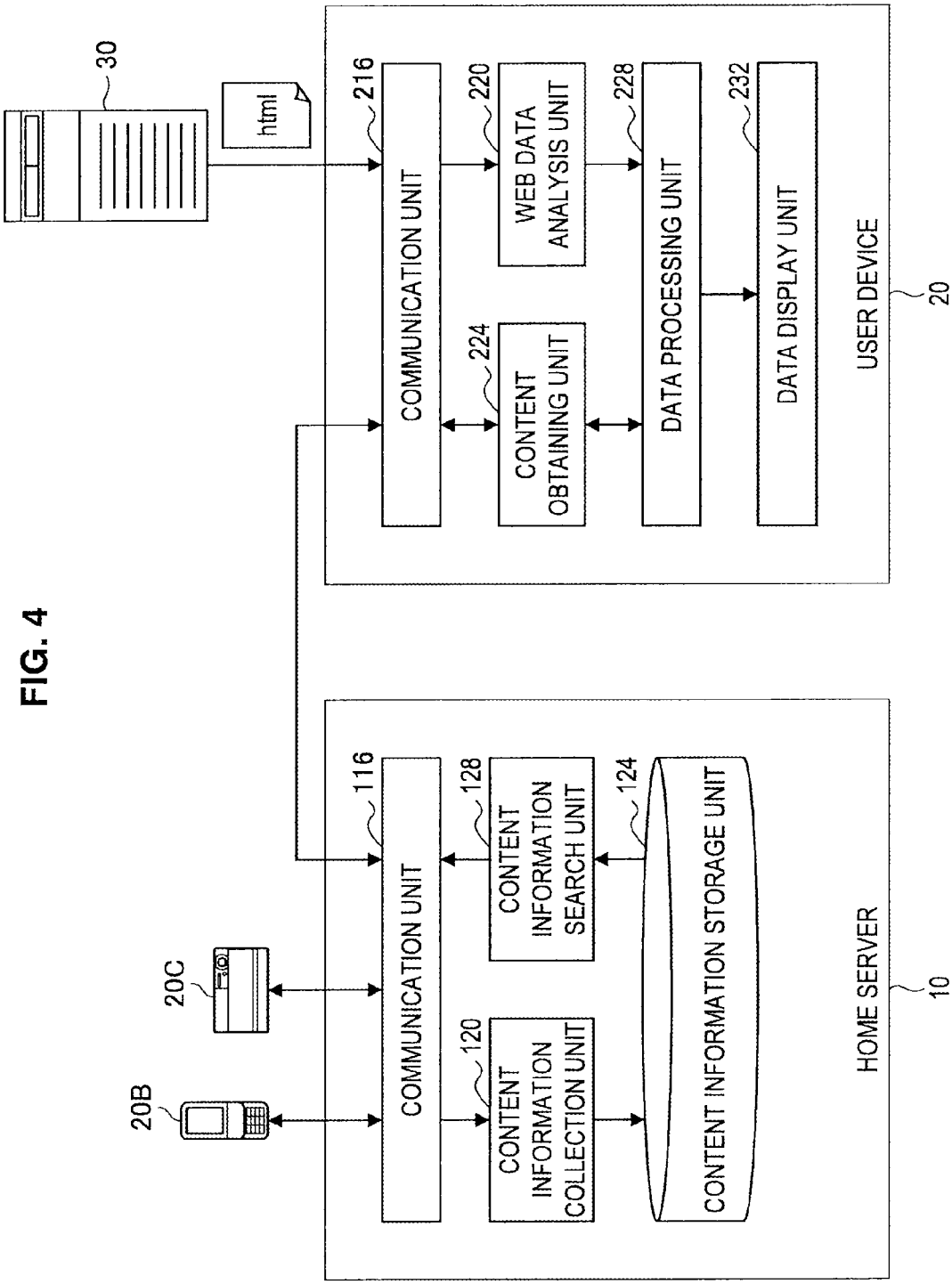
FIG. 4 is a function block diagram for illustrating a configuration of a user device and a home server according to the first exemplary embodiment of the present invention.

FIG. 4 is a function block diagram for illustrating a configuration of the user device 20 and the home server 10. As shown in FIG. 4, the home server 10 includes a communication unit 116, a content information collection unit 120, a content information search unit 128, and a content information storage unit 124.

The communication unit 116 functions as a transmitting unit and a receiving unit that transmits/receives information to/from each of the user devices 20 consisting of the home network. The content information collection unit 120 collects content information of local content such as images, movies, or the like that are stored in each of the user devices 20.

The content information storage unit 124 is a storage medium for storing content information (local data) collected by the content information collection unit 120. Note that the content information storage unit 124 may be a storage medium such as a non-volatile memory, a magnetic disk, an optical disk, a magneto optical (MO) disk, and the like. The non-volatile memory may be an electrically erasable programmable read-only memory (EEPROM), and an erasable programmable ROM (EPROM), for example. Also, the magnetic disk may be a hard disk, a discoid magnetic disk, and the like. Also, the optical disk may be a compact disc (CD), a digital versatile disc recordable (DVD-R), a Blu-ray disc (BD; registered trademark), and the like.

The content information search unit 128 searches content information stored in the content information storage unit 124. For example, the content information search unit 128 searches content information matching a search condition received from the user device 20. Note that if local content is stored in the content information storage unit 124, the content information search unit 128 may also search the local content from the content information storage unit 124.

Further, the user device 20 includes, as shown in FIG. 4, a communication unit 216, a Web data analysis unit 220, a content obtaining unit 224, a data processing unit 228 and a data display unit 232.

The communication unit 216 functions as a transmitting unit and a receiving unit that transmits/receives information to/from a server device 30, other user devices 20B and 20C, and a home server 10. For example, the communication unit 216 receives Web data from the server device 30, receives content information from the home server 10, and receives local content from the other user devices 20B and 20C.

The Web data analysis unit 220 analyzes Web data created in HTML format or XML format, which are received by the communication unit 216. Specifically, the Web data analysis unit 220 according to the present exemplary embodiment extracts a data portion with a tag for synthesis that is a specific identifier from the Web data.

The content obtaining unit 224 obtains local content to be synthesized to the data portion with the tag for synthesis from the home network. Specifically, when the data portion with the tag for synthesis is set with a search condition, the content obtaining unit 224 requests the home server 10 for content information of the local content that matches the search condition, and obtains the local content based on the content information obtained from the home server 10.

The data processing unit 228 synthesizes the Web data received from the Web server 30 with the local content obtained by the content obtaining unit 224. Specifically, the data processing unit 228 replaces the data portion with the tag for synthesis in the Web data with the local content obtained by the content obtaining unit 224. The data display unit 232 renders the Web data after synthesized by the data processing unit 228, and display it on a screen.

As mentioned above, referring to FIG. 4, the overview of the functions of the user device 20 and the home server 10 has been explained. In the following, a process of collecting content information by the home server 10 and a process of synthesizing local content by the user device 20 will be explained in detail.

(1-4. Collection of Content Information)

Figure 5:
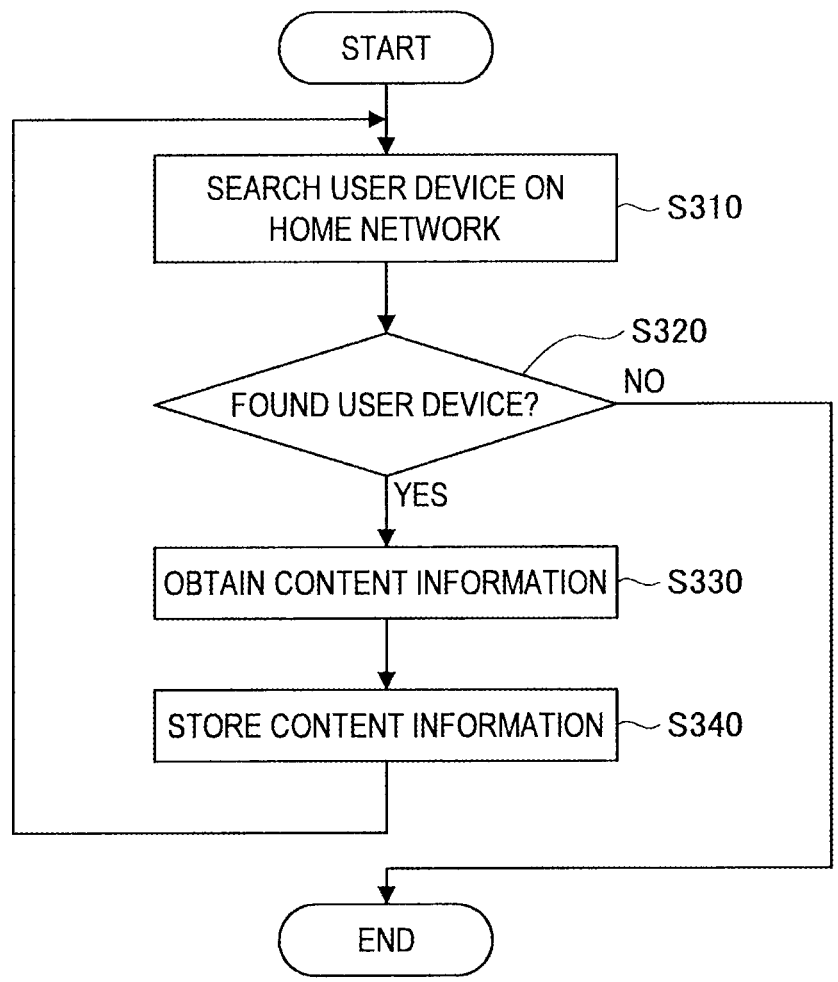
FIG. 5 is a flow chart for illustrating how the home server collects content information.

FIG. 5 is a flow chart for illustrating how the home server 10 collects content information. This process of collecting content information is a process independent from the later-described process of synthesizing local content, and is performed regularly to update the content information.

As shown in FIG. 5, the content information collection unit 120 of the home server 10 searches, at first, the user device 20 that is connected to the home network (S310). For example, the content information collection unit 120 searches the user device 20 using a protocol to search and find an universal plug & play (UPnP) device on a network, the protocol which is a simple service discovery protocol (SSDP), for example.

Then, when the user device 20 is found in the home network (S320), the content information collection unit 120 obtains content information of local content stored in the user device 20 that has been found (S330). After that, the content information storage unit 124 stores the content information obtained by the content information collection unit 120 (S340). Note that if the user device 20 would not been found in the home network, this collecting process will be ended.

Here, referring to FIG. 6, an explanation will be given on a concrete example of the content information stored in the content information storage unit 124.

FIG. 6 is an explanatory diagram for illustrating a concrete example of the content information. As shown in FIG. 6, the content information includes a management ID, Type, URL, and Tag. The management ID is an unique ID for managing the content information. Type is information indicating types of local content, such as image, movie, music, or the like. URL is information indicating the user device and its location, which stores the local content. Tag is a keyword of the local content, and is used for searching the content information.

Note that if the local content is an image, for example, Tag is to be generated from information, such as EXIF (Exchangeable Image File Format), which is contained in the content data including a shooting date/time, a shooting place, size, and title, and so on.

Tag may also a name of folders in which the local content is located. For example, if an image is stored in a folder hierarchy of /2009/trip/Trip_to_Okinawa, in the user device 20B, Tag may include "2009", "trip" and "Trip_to_Okinawa".

The home server 10 may perform such process of collecting content information not only regularly, but also in response to a request from the user device 20 to be connected to the home network. For example, when the user device 20 is newly connected to the home network, or when the local content stored by the user device 20 has been changed (added, edited, deleted, and so on), the user device 20 may request the home server 10 to update the content information, and the home server 10 may perform a process of collecting the content information in response to the request.

(1-5. Synthesis of Local Content)

Figure 7:
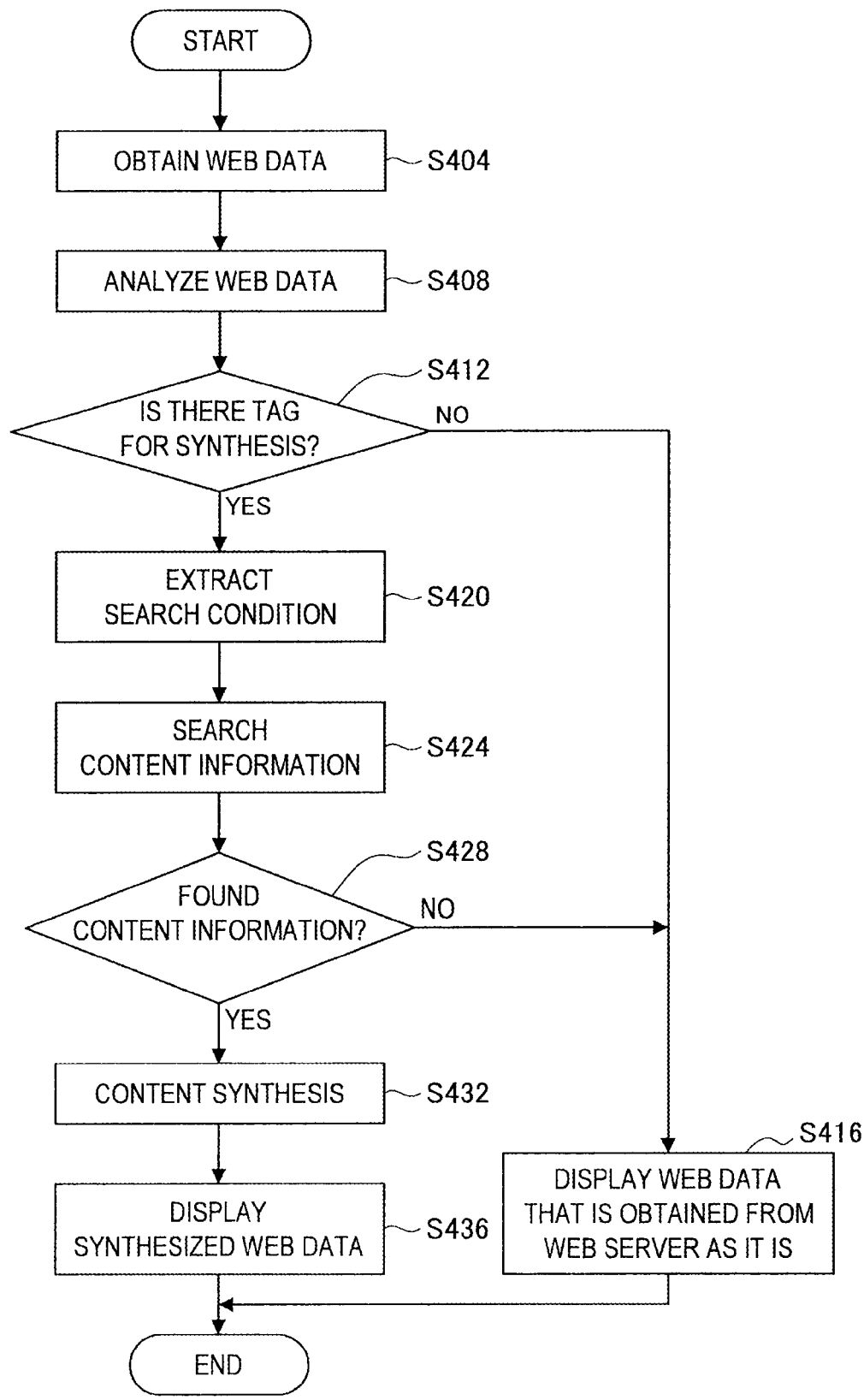
FIG. 7 is a flow chart for illustrating how the user device synthesizes local content.

FIG. 7 is a flow chart for illustrating how the user device 20 synthesizes local content. The process of synthesizing starts when a user accesses to a Website which the Web server 30 on the external network 12 provides. In order to implement the function of the process of synthesizing into the user device, a Web browser compatible with the process of synthesizing may be installed into the user device 20, or a plug-in may be installed into the user device 20.

As shown in FIG. 7, the communication unit 216 of the user device 20 obtains Web data created in HTML format from the Web server 30 on the external network 12 (S404). Then the Web data analysis unit 220 analyzes the Web data created in HTML format, and extracts a tag for synthesis from tags of the Web data (S408).

For example, a Website master sets a class name of a tag of <img> indicating an image into "changable", when implementing an image which can be replaced with a user's personal photo image into the Web data. In this case, the Web data analysis unit 220 extracts a tag whose class name is "changable" from the Web data in the step S412. This saves a user steps to specify manually to where in the Web data the local content is to be synthesized, therefore, it is much convenient for the user. Moreover, the existing user device, which is not compatible with the process of synthesizing local content, can display a default image that is provided by the Web server 30.

If the tag for synthesis is not found in the step S408 (S412), the data display unit 232 displays the Web data obtained from the Web server 30 in the step S404 as it is (S416).

On the contrary when the tag for synthesis is found in the step S408 (S412), the Web data analysis unit 220 extracts a search condition added to the tag for synthesis (S420). For example, the Web data analysis unit 220 extracts "Type=image" as a search condition, when extracted a <img> tag with "changable". Moreover, the Web data analysis unit 220 may extract a width and height of image as a search condition from attributes such as "width" and "height" in the <img> tag. Further, when the <img> tag set with "changable" is defined with a data attribute, the data attribute can be used as a search condition. For example, when a data attribute of "data-key="trip"", "trip" can be extracted as a search condition for a search by keywords.

Subsequently, the content obtaining unit 224 cooperates with the home server 10 to search local content matching the search condition extracted by the Web data analysis unit 220 (S424). Specifically, the content obtaining unit 224 requests the home server 10 to search content information matching the search condition extracted by the Web data analysis unit 220, and the content information search unit 128 of the home server 10 searches the content information matching the search condition from the content information storage unit 124.

For example, if a search conditions is "Type=image", a size of image is "horizontally long", and "keyword=trip", content information in which Type is "image", Tag is "2009/9, Trip_to_Okinawa, trip, 1280*720", and the management ID is "1001" will be searched from the content information shown in FIG. 6.

When the content information matching the search condition has been found in step S424 (S428), the data processing unit 228 synthesizes the Web data obtained in S404 and the content information obtained by the content obtaining unit 224 (S432). That is, the data processing unit 228 replaces information of a tag with a tag for synthesis "changable" with the local content obtained by the content obtaining unit 224. For example, when the tag for synthesis "changable" is set with the <img> tag, the data processing unit 228 may replace a src attribute indicating to which the image refer with an URL of the content information obtained by the content obtaining unit 224.

Subsequently, the data display unit 232 renders the Web data synthesized with the local content as it is, as normally, and displays it on a screen (S436). On the other hand, when the content information matching the search condition is not found in S424 (S428), the data display unit 232 displays the Web data obtained in S408 as it is (S416).

As explained above, according to the present exemplary embodiment, it is possible to obtain Web data on the external network 12 and to replace a part of the obtained Web data with content information of local content managed in the home network so as to synthesize the Web data on the external network 12 and the local content in the home network, and to display it.

Note that the example explained above is a case where a process of synthesis has been started at the time when the user device 20 obtains Web data from the Web server 30, however, a trigger in which the user device 20 starts the process of synthesis is note limited to such example. For example, if a button for starting the process of synthesis is arranged in the Web data, being selected a button for starting the process of synthesis by the user may trigger the user device 20 to start a script (JavaScript) that performs the process of synthesis. Moreover, if the script (JavaScript) describing the process of synthesis is made into a "Bookmarklet" which is to be registered in a bookmark, the user device 20 may start the process of synthesis when the user clicks the registered bookmark. These methods need a clear user instruction to start the process of synthesis, while there is an advantage that it does not need to install newly a Web browser, or to add plug-ins since it can be executed in the framework of the existing Web browser.

Further, the example explained above is a case where the data processing system 1 includes the home server 10, however, the functions of the home server 10 may be implemented into the user device 20 instead. In this case, the user device 20 can obtain content information without communicating with external devices.

<2. Second Exemplary Embodiment>

The first exemplary embodiment that replaces a part of the Web data provided by the Web server 30 with local content and displays it has been explained as above. Next, referring to FIG. 8 to FIG. 11, a second exemplary embodiment of the present invention will be explained. According to the second exemplary embodiment of the present invention, it is possible to change a configuration of the Web data provided by the Web server 30 based on user profile information (local data).

(2-1. Functions of a User Device and a Home Server According to the Second Exemplary Embodiment)

Figure 8:
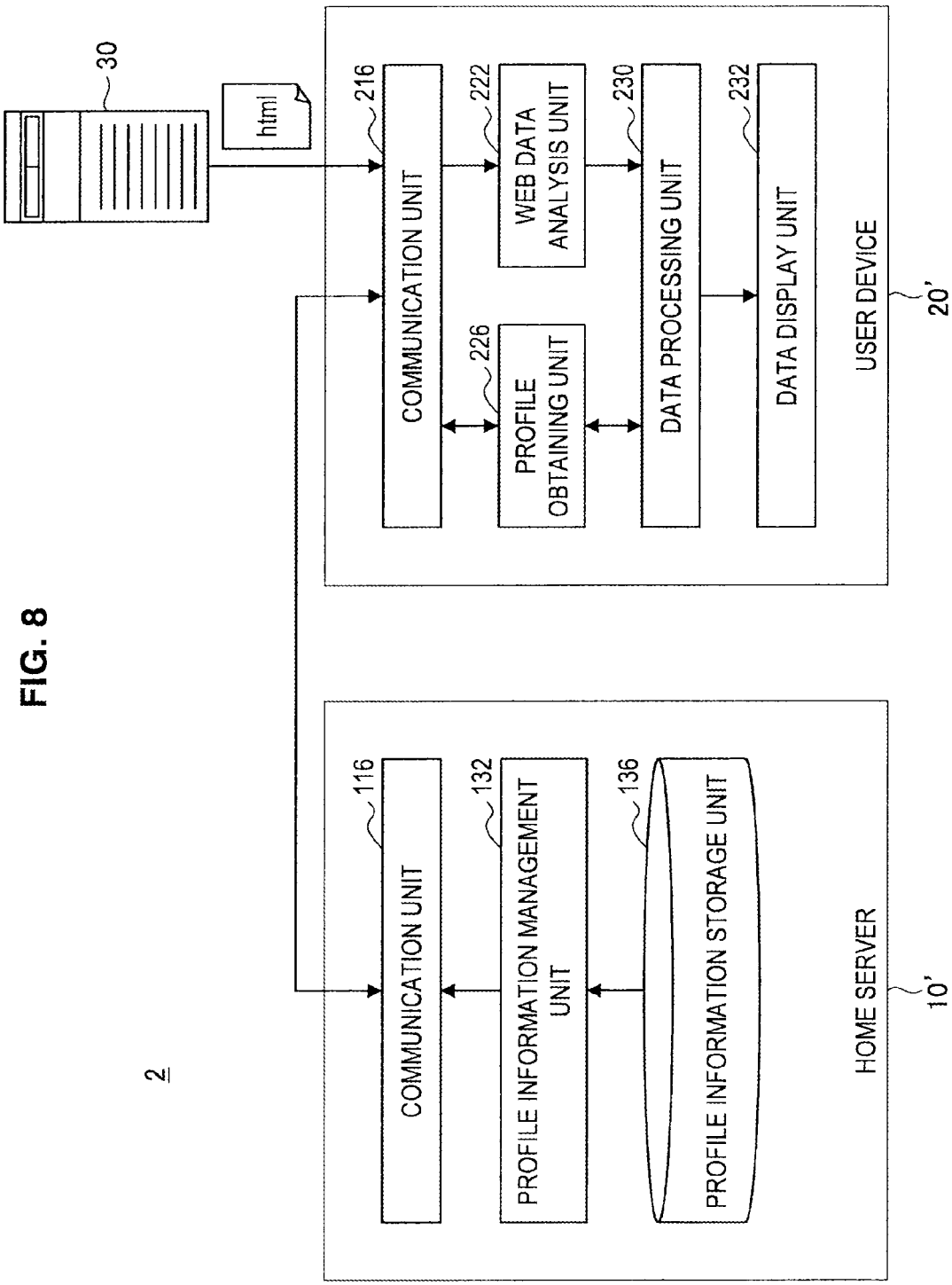
FIG. 8 is a function block diagram for illustrating a configuration of a user device and a home server according to a second exemplary embodiment of the present invention.

FIG. 8 is a function block diagram for illustrating a configuration of a user device 20' and a home server 10' according to the second exemplary embodiment. As shown in FIG. 8, the home server 10' according to the second exemplary embodiment includes the communication unit 116, a profile information management unit 132, and a profile information storage unit 136.

The profile information storage unit 136 stores user profile information, and the profile information management unit 132 creates, edits, deletes and obtains the profile information. The profile information includes, as shown in FIG. 9, information of user's date of birth, sex, address and hobby, or the like.

Further, the user device 20' according to the second exemplary embodiment includes the communication unit 216, a Web data analysis unit 222, a profile obtaining unit 226, a data processing unit 230, and the data display unit 232.

The Web data analysis unit 222 analyzes Web data obtained from the Web server 30 by the communication unit 216, and extracts a data portion with a specific identifier such as a tag for selecting what to display or a tag for sorting, and a search condition from the Web data. The profile obtaining unit 226 cooperates with the home server 10' to obtain profile information matching the search condition. For example, if the search condition is "star sign", the profile obtaining unit 226 obtains a star sign from "date of birth" contained in the profile information.

The data processing unit 230 changes data of the data portion with the specific identifier in the Web data based on the profile information obtained by the profile obtaining unit 226. Specifically, the data processing unit 230 selects data to be displayed from the data portion with the tag for selecting what to display, and changes the order of the data contained in the data portion with the tag for sorting. The more detail explanation will be given on these processes below.

(2-2. Selecting Web Data to be Displayed)

Figure 10:
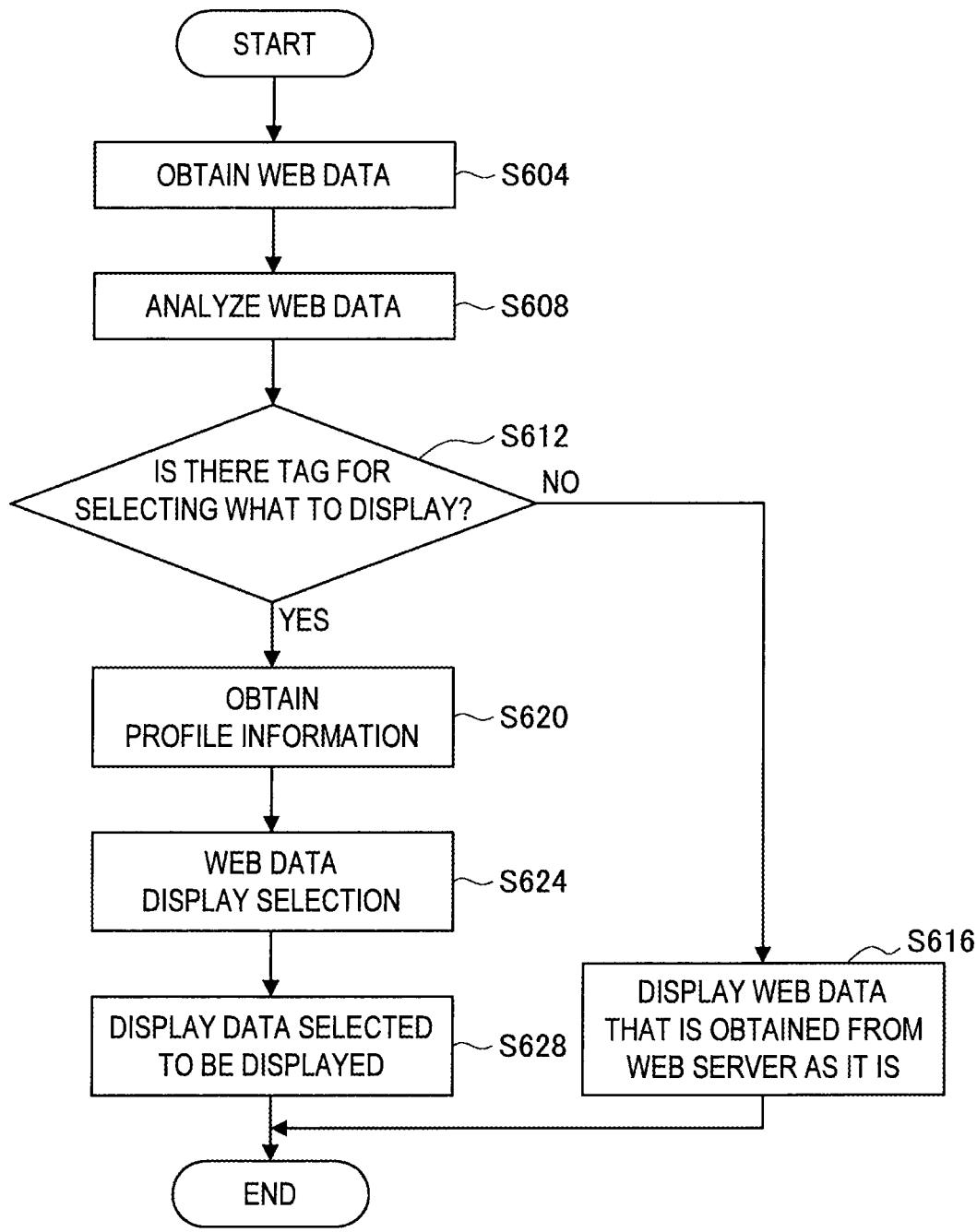
FIG. 10 is a flow chart for illustrating how the user device selects what to display.

FIG. 10 is a flow chart for illustrating how the user device 20' selects what to display. As shown in FIG. 10, when the communication unit 216 of the user device 20' obtains Web data from the Web server 30 on the external network 12 (S604), the Web data analysis unit 222 analyzes the Web data, and extracts a tag for selecting what to display "selectable" from the Web data (S608). Hereinafter, a configuration example of the Web data for astrology including the tag for selecting what to display "selectable".

```
<div class="selectable">
    <div>What is your fortune today?</div>
    <div style="visibility:visible;position:absolute;"
    data-key="ram">Aries  85 points</div>
    <div style="visibility:visible;position:absolute;"
    data-key="bull">Taurus  50 points</div>
    <div style="visibility:visible;position:absolute;"
    data-key="twins">Gemini  78 points</div>
    ...
</div>
```

If the tag for selecting what to display is extracted by the Web data analysis unit 222 in S608 (S612), the profile obtaining unit 226 obtains user profile information from the home server 10' (S620). Further, the data processing unit 230 selects data matching the user profile information as object to be displayed in the data portion with the tag for selecting what to display (S624). For example, if the user's star sign is "Aries", the data processing unit 230 may set only "visibility" of "Aries" to "visible", and may set "visibility" of other star signs to "hidden".

Subsequently, the data processing unit 232 displays the data selected to be displayed by the data processing unit 230 on a screen (S628). That is, the data processing unit 232 can display a fortune of "Aries" only, which is the user's star sign, among all the star signs. On the other hand, if the Web data does not include a tag for selecting what to display, the data display unit 232 displays the Web data obtained in S604 as it is (S616). For example, if the above-described Web data for astrology is obtained in S604, the data display unit 232 displays fortunes of all star signs.

With such process of selecting what to display, it is possible to provide a user selectively information which matches the user. Moreover, the above explanation has been given an example of the Web data for astrology, however, the same process can be performed for various Web data such as weather information in neighborhood area, traffic information, or the like.

(2-3. Sorting Web Data)

Figure 11:
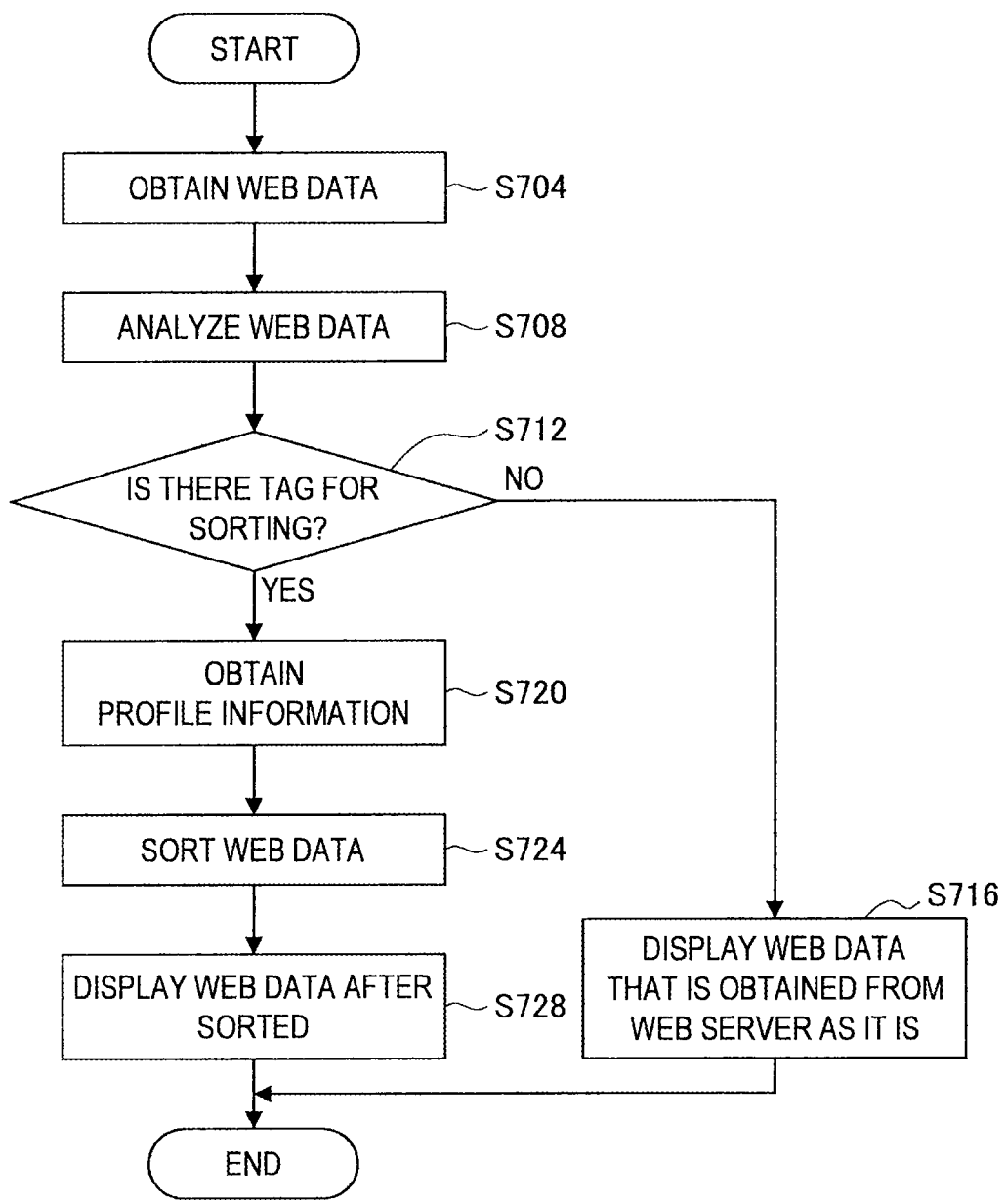
FIG. 11 is a flow chart for illustrating a flow of how the user device sorts the order of Web data.

FIG. 11 is a flow chart for illustrating a flow of how the user device 20' sorts the order of Web data. As shown in FIG. 11, when the communication unit 216 of the user device 20' obtains Web data from the Web server 30 on the external network 12 (S704), the Web data analysis unit 222 analyzes the Web data, and extracts a tag for sorting "sortable" from the Web data (S708). Hereinafter, a configuration example of the Web data including the tag for sorting "sortable".

```
<ul class="sortable">
    <li data-key="politics">The mayor of the tent village to be appointed as a special advisor to National Policy Unit </li>
    <li data-key="sports baseball">Saito off to negotiation with 20
```
professional baseball teams in Japan and the US</li>
```
    <li data-key="health tokyo">XX prefecture suspected of H1N1 virus infection </li>
    <li data-key="music">Why Japanese "visual artists" are getting popular overseas </li>
    <li data-key="movie">The former Prime Minister to make his voice actor debut in the movie "YYY"? </li>
    ...
</ul>
```

If the tag for sorting is extracted by the Web data analysis unit 222 in S708 (S712), the profile obtaining unit 226 obtains user profile information from the home server 10' (S720). Further, the data processing unit 230 sorts the order of data so that data matching the user profile information goes to the top in the data portion with the tag for sorting.

For example, if an address is "Tokyo" and a hobby is "movie" in the profile information, the data processing unit 230 sorts the order of the data so that "XX prefecture suspected of H1N1 virus infection" and "The former Prime Minister to make his voice actor debut in the movie "YYY"?" rank in upper level in the data portion with the tag for sorting.

Subsequently, the data display unit 232 displays the Web data sorted in S724 (S728). Here, since the data matching the user profile information ranks in the top, the user easily accesses to information which the user is interested in. If the Web data does not include a tag for sorting, on the contrary, the data display unit 232 displays the Web data obtained in S704 in the order as it is (S716).

A case where the data processing system 2 according to the second exemplary embodiment includes the home server 10' has been explained above, however, the function of the home server 10' may be implemented into the user device 20'. In this case, the user device 20' can obtain profile information without communicating with the external devices.

<3. Conclusion>

As explained above, according to the first exemplary embodiment and the second exemplary embodiment of the present invention, it is possible to extract a specific identifier from Web data, and change a data portion with the specific identifier in accordance with a user. For example, according to the first exemplary embodiment, since local content such as images and movies that the user owns are to be displayed along with commodities on a Webpage, the user can easily get a concrete idea what the commodity is like after purchasing it. Moreover, according to the second exemplary embodiment, it is possible to provide selectively or preferentially information that the user is interested in.

Further, since private local content information and private profile information is accumulated in the home server 10 separately from each of the Web server 30, it is not necessary to set or login for each of the Web server 30. For example, a portal site can provide unique Web data to each user as far as user profile information is registered in the portal site. However, since the profile information has not been shared among portal sites, each user has needed to register the profile information in each portal site. On the contrary, according to the second exemplary embodiment of the present invention, it is possible to convert the Web data provided by each of the portal sites into data matching each user, by just changing the profile information of the home server 10'.

Further, according to the second exemplary embodiment, since the profile information is accumulated in the home server 10, it is more difficult to access to the profile information from the external network 12, comparing to the case where it is managed on the external network 12, and security will also be improved. Since the profile information is not open to others, the user feels safe.

A preferred exemplary embodiment of the present invention has been explained in detail above with reference to the attached drawings, the present invention is not limited to this example. It should be understood by those skilled in the art that various modifications, combinations, sub-combinations and alterations may occur depending on design requirements and other factors insofar as they are within the scope of the appended claims or the equivalents thereof.

For example, in the first exemplary embodiment, an image is explained as an example of local content to be synthesized with Web data, however, the local content to be synthesized with the Web data is not limited to an image. For example, it is possible to attach a tag for synthesis to a portion of music data in the Web data. In this case, the user device 20 may replace the music data in the Web data with music data that is managed in the home server 10. Note that as a search condition of the music data, there may be genre, tempo, reproducing time, and created date/time, or the like. With such configuration, it is possible to provide a user the Web data provided by the Web server 30 while reproducing the music data that the user owns.

For example, each step in the processes of the home server 10 and the user device 20 is not necessarily processed in the order of time series described in sequence diagrams or flow charts. For example, each step of the processes of the home server 10 and the user device 20 may be processed in a different order from the order described in the sequence diagrams or the flow charts, or may be processed in parallel.

Moreover, it is also possible to create a program to cause hardware such as the CUP 201, the ROM 202 and the RAM 203, or the like built in the home server 10 and the user device 20, to fulfill the functions equivalent to the ones in each of configurations of the above-described home server 10 and the user device 20. Further, a storage medium to store the computer program is to be provided.

The present application contains subject matter related to that disclosed in Japanese Priority Patent Application JP 2009-264240 filed in the Japan Patent Office on Nov. 19, 2009, the entire content of which is hereby incorporated by reference.

What is claimed is:

1. A data processing system comprising:
   a server device for providing Web data comprising a data portion with a specific identifier and a search condition; and
   a data processing apparatus comprising:
      a receiving unit to receive the Web data from the server device;
      an analysis unit to analyze the Web data to extract the specific identifier and the search condition from the Web data;
   an obtaining unit to attempt to obtain local data matching the search condition; and
      a data processing unit to:
         when the obtaining unit obtains the local data matching the search condition, change the data portion with the specific identifier based on the local data obtained by the obtaining unit, wherein the specific identifier indicates to the data processing apparatus how the data portion may be changed; and
         when the obtaining unit fails to obtain the local data matching the search condition, leave the data portion with the specific identifier unchanged.

2. The data processing system according to claim 1, wherein:
   the data processing unit replaces the data portion with the specific identifier with the local data obtained by the obtaining unit.

3. The data processing system according to claim 2, wherein:
   the local data is managed by the data processing apparatus or a home network which comprises a plurality of devices including the data processing apparatus.

4. The data processing system according to claim 1, wherein:
   the local data includes user profile information; and
   the data processing unit selects data corresponding to the profile information from the data portion with the specific identifier.

5. The data processing system according to claim 1, wherein
   the local data includes user profile information; and
   the data processing unit sorts an order of data contained in the data portion with the specific identifier based on the profile information.

6. A data processing apparatus comprising:
   a communication device to receive Web data from a server device providing the Web data having a data portion with a specific identifier and a search condition;
   an analysis unit to analyze the Web data to extract the specific identifier and the search condition from the Web data;
   an obtaining unit to attempt to obtain local data matching the search condition; and
   a data processing unit to:
      when the obtaining unit obtains the local data matching the search condition, change the data portion with the specific identifier based on the local data obtained by the obtaining unit, wherein the specific identifier indicates to the data processing apparatus how the data portion may be changed; and
      when the obtaining unit fails to obtain the local data matching the search condition, leave the data portion with the specific identifier unchanged.

7. The data processing apparatus according to claim 6, wherein:
   the data processing unit replaces the data portion with the specific identifier with the local data obtained by the obtaining unit.

8. The data processing apparatus according to claim 7, wherein:
   the local data is managed by the data processing apparatus or a home network which comprises a plurality of devices including the data processing apparatus.

9. The data processing system according to claim 6, wherein:
   the local data includes user profile information, and
   the data processing unit selects data corresponding to the profile information from the data portion with the specific identifier.

10. The data processing apparatus according to claim 6, wherein:
    the local data includes user profile information; and
    the data processing unit sorts an order of data contained in the data portion with the specific identifier based on the profile information.

11. At least one computer-readable storage device encoded with instructions that, when executed, perform a method comprising:
    receiving Web data from a server device providing the Web data having a data portion with a specific identifier and a search condition;

analyzing the Web data to extract the specific identifier and the search condition from the Web data;

attempting to obtain local data matching the search condition;

when the local data matching the search condition is obtained, changing the data portion with the specific identifier based on the local data, wherein the specific identifier indicates to the data processing unit how the data portion may be changed; and when the local data matching the search condition is not obtained, leave the data portion with the specific identifier unchanged.

12. The at least one computer readable storage device according to claim 11, wherein the method further comprises:

obtaining the local data matching a search condition, which is set by the data portion with the specific identifier, and wherein changing the data portion is based on the local data obtained by the obtaining unit.

13. The at least one computer readable storage device according to claim 12, wherein:

changing the data portion comprises replacing the data portion with the specific identifier with the local data.

14. A data processing method comprising:

receiving Web data from a server device providing the Web data comprising a data portion with a specific identifier and a search condition;

analyzing the Web data to extract the specific identifier and the search condition from the Web data;

attempting to obtain local data matching the search condition;

when the local data matching the search condition is obtained, changing the data portion with the specific identifier based on the local data, wherein the specific identifier indicates how the data portion may be changed; and when the local data matching the search condition is not obtained, leave the data portion with the specific identifier unchanged.

15. The data processing method according to claim 14, wherein:

changing the data portion comprises replacing the data portion with the specific identifier with the local data.

16. The data processing method according to claim 14, wherein:

the local data includes user profile information; and changing the data portion comprises selecting data corresponding to the profile information from the data portion with the specific identifier.

17. The data processing method according to claim 14, wherein the local data includes user profile information, and changing the data portion comprises sorting an order of data contained in the data portion with the specific identifier based on the profile information.

* * * * *